United States Patent [19]
McCrobie et al.

[11] 4,331,388
[45] May 25, 1982

[54] GAS ZOOM LENS

[75] Inventors: George L. McCrobie, Ontario, Calif.; James D. Rees, Pittsford, N.Y.; Roscoe J. Donnel, Glendale, Calif.

[73] Assignee: Xerox Corporation, Stamford, Conn.

[21] Appl. No.: 124,182

[22] Filed: Feb. 25, 1980

[51] Int. Cl.³ .......................... G02B 1/06; G02B 3/12
[52] U.S. Cl. .................................................. 350/419
[58] Field of Search ............................... 350/418, 419

[56] References Cited
U.S. PATENT DOCUMENTS

| | | | |
|---|---|---|---|
| 3,355,235 | 11/1967 | Berreman | 350/418 X |
| 3,364,816 | 1/1968 | Jeffree | 350/418 X |
| 3,498,695 | 3/1970 | Brouwer | 350/418 |
| 3,528,727 | 9/1970 | Halliday | 350/419 X |

OTHER PUBLICATIONS

Rees, J. D.; "Technique for Varying Focal Length of a Lens"; *Xerox Disclosure Bulletin*; vol. 1, No. 11/12; Nov./Dec. 1976; pp. 61–62.

*Primary Examiner*—John K. Corbin
*Assistant Examiner*—Scott J. Sugarman

[57] ABSTRACT

A multi-element lens is provided having a central cavity containing a heavy, high index gas. The central cavity is defined by a pair of meniscus elements and acts as a thick positive lens. The pressure of the gas in the cavity is varied in response to magnification changes desired, the pressure change causing a change in the refractive index of the gas thereby altering the focal length of the lens.

4 Claims, 4 Drawing Figures

GAS ZOOM LENS

BACKGROUND OF THE INVENTION

This invention relates to a zoom or variable focal length lens and, more particularly, to a multi-element zoom lens whose focal length is varied in response to a desired magnification change by varying the pressure of a gas enclosed between at least two of the lens elements.

As is known in the art, multi-element zoom lens typically achieve a variation in focal length by mechanically varying the spacing between elements or groups of elements. U.S. Pat. Nos. 3,630,599 and 3,640,605 are representative of such lenses. These lenses require very precise movement of lens elements or lens groupings typically involving use of cams and related linkages. These demands result in relatively high cost.

A technique for varying focal length in a compound lens by varying gas pressure at the inter-lens media has been described by James D. Rees in an abstract entitled "Technique for Varying Focal Length of a Lens" published in Xerox Disclosure Journal, Vol. I, No. 11/12. Applicants have discovered that a preferred lens construction, when utilized with a preferred group of gases in an enclosed cavity between lens elements provide an exemplary variable magnification lens.

SUMMARY

It is, therefore, the main object of this invention to provide a non-mechanically compensated zoom lens capability.

It is a further object to provide a preferred multi-element lens configuration which results in optimum focal length variation.

It is a still further object to provide a zoom lens having a reduced cost (relative to the prior art) mechanically-compensated lenses.

These and other objects are realized by constructing a multi-element lens, the elements so arranged that an enclosed cavity between a lens element pair approximates a thick negative lens. A heavy, high index gas is maintained within this cavity. The thick lens formed by the cavity has the characteristics of becoming less negative (more positive) as the index of refraction of the enclosed gas is increased. The gas pressure is increased or decreased in response to magnification requirements causing a corresponding change in the refractive index of the gas and hence of the lens focal length.

DRAWINGS

DESCRIPTION

Although the present invention has utility in a wide varity of applications, the following description is directed towards its use as the imaging lens in a variable magnification photocopier.

In a photocopying environment where variable magnification is desired, a magnification range of 1.0× to 0.6× is generally sufficient for most copying purposes. This relatively small magnification range necessitates a correspondingly limited range of lens focal length change. Focal length and magnification in an optical system are related by the following equation.

$$TC = (F + F/m) + (F + Fm) \text{ (thin lens approximation)} \quad (1)$$

wherein:
TC = total conjugate
F = lens focal length
m = magnification
(F + F/m) = object conjugate
(F + Fm) = image conjugate The focal length of a compound lens is a function of several parameters, including the refractive index of the inter-lens media. The lens focal length can be changed by varying the refractive index of the medium between the lenses, (which is temperature and pressure dependent) in accordance with the following relationship:

$$n_{tp} - 1 = (n_o - 1)/(1 + \alpha t) \cdot P/760 \text{ (ideal gas approximation)} \quad (2)$$

wherein:
$n_{tp}$ = index of refraction of gas at given temperature and pressure
$n_o$ = index of refraction of gas at 0° C. and 760 mm $H_g$
t = temperature in °C.
$\alpha$ = coefficient of thermal expansion of gas
p = pressure of gas in mm $H_g$
P/760 = number of atmospheres pressure As is shown in the art, the change in index of refraction of an element or air space ($\Delta n$) can be correlated to a specific change in lens focal length ($\Delta f$). It has been discovered, however, that certain types of lenses are particularly adapted to be used as gas zoom lenses. Also a preferred group of heavy, high index gases have been found to provide optimum results when used as the interlens medium. Examples of specific lens designs are as follows.

Figure 1:
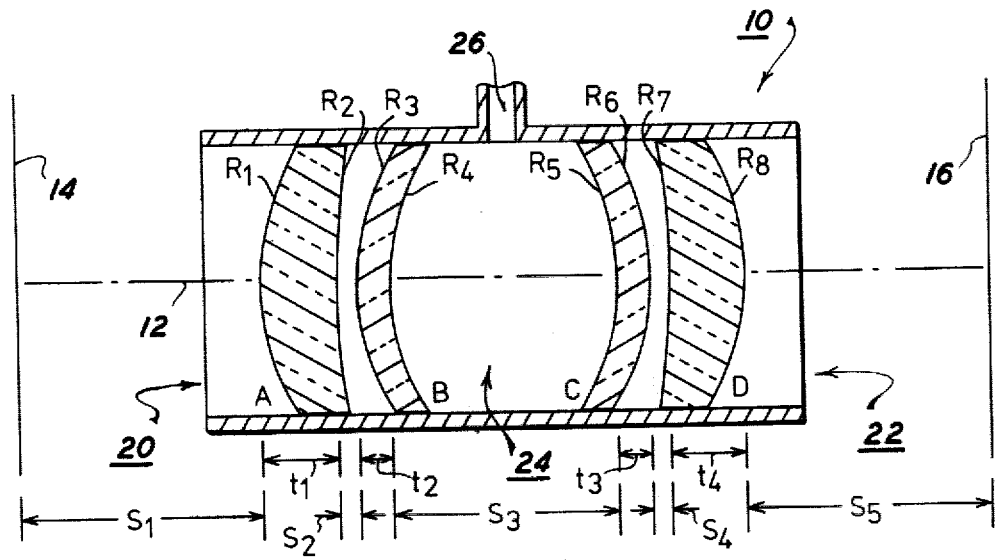
FIG. 1 is an optical diagram of one embodiment of the present invention.

Referring now to FIG. 1, a zoom lens generally indicated at 10, is disposed on an optical axis 12. An object plane is designated as 14 and an image plane at 16. Zoom lens 10 comprises a first lens element group 20 (A, B) and second lens element group 22 (C and D). Separating the negative meniscus elements B and C is a cavity 24 which, because of the configuration of elements Band C, acts as a negative lens element. Cavity 24 communicates by means of tube 26 with a source of variable gas pressure shown in FIG. 2. The chart in Table 1 provides constructional data for lens 10.

TABLE 1

| Lens | Radius | Thickness | Spacing | $n_d$ | v |
|---|---|---|---|---|---|
| | | | $S_1 = 269.55$ | | |
| A | $R_1 = 27.0104$ | | | | |
| | | $t_1 = 9.79$ | | 1.487 | 70.41 |
| | $R_2 = 53.2409$ | | | | |
| | | | $S_2 = 1.59$ | | |
| B | $R_3 = 21.3087$ | | | | |
| | | $t_2 = 4.0$ | | 1.755 | 27.58 |
| | $R_4 = 15.5397$ | | | | |
| | | | $S_3 = 25.93$ | Gas | |
| C | $R_5 = -26.8834$ | | | | |
| | | $t_3 = 4.0$ | | 1.755 | 27.58 |
| | $R_6 = -35.1491$ | | | | |
| | | | $S_4 = 1.68$ | | |
| D | $R_7 = -60.3301$ | | | | |
| | | $t_4 = 10.98$ | | 1.487 | 70.41 |
| | $R_8 = -29.0170$ | | | | |

TABLE 1-continued

| Lens | Radius | Thickness | Spacing | $n_d$ | v |
|---|---|---|---|---|---|
| | | | $S_5 = 264.41$ | | |

Note: All dimensions are in millimeters

Positive radius indicates center of curvature is to right.

Negative radius indicates center of curvature is to left.

The heavy high index gas used to fill cavity 24, in a preferred embodiment, is chloropentofluoroethane (Freon 115), an inert gas which has a refractive index of 1.001 at room pressure and 1.007 at 75 psi. In FIG. 1, it is assumed that the gas is at room pressure and the magnification is at unity (1×). It is further assumed that the gas is contained only within cavity 24 and that the gas is essentially non-dispersive throughout the visible spectrum and that variation of the system with variations in ambient temperature are essentially zero.

Figure 2:
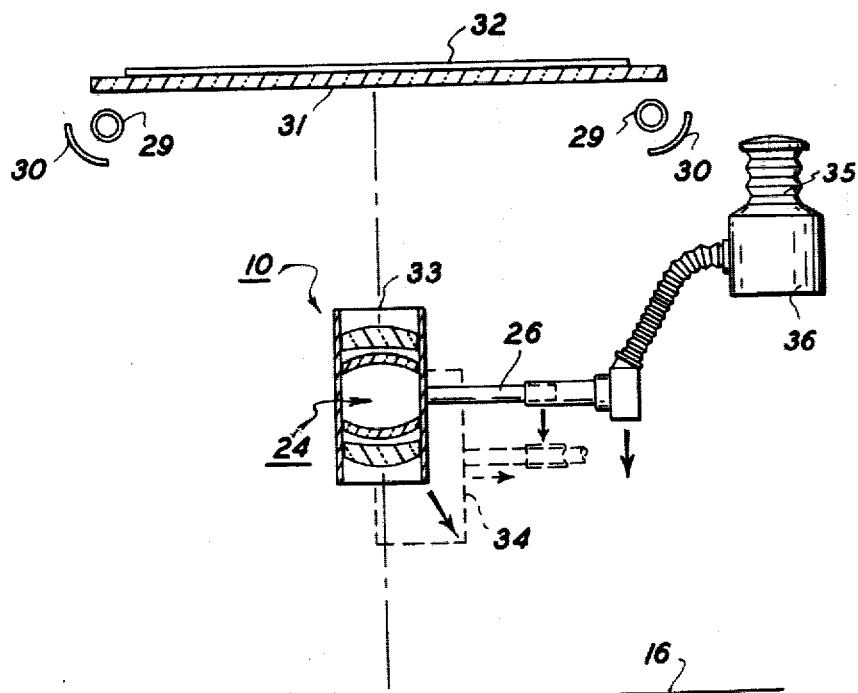
FIG. 2 is a schematic diagram of the lens of FIG. 1 in a multi-magnification, full frame photocopier environment.

FIG. 2 is a schematic representation of the use of gas zoom lens 10 in a full frame, variable magnification photocopier environment. Lamps 29 and reflectors 30 illuminate the underside of platen 31 upon which a document 32 to be reproduced is placed. Lens 10, at position 33 is at unity magnification position and projects an image of document 32 onto image plane 16 which may be, for example, a belt-type photoreceptor. Assuming that a magnification ratio of 0.64× is required, lens 10 is translated by means not shown to dotted position 34 to change magnification in accordance with the relationship expressed in Equation 1.

Simultaneously, the pressure of the gas within cavity 24 of the zoom lens is increased to 75 psi by movement of bellows 35 compressing the gas within cylinder 36. (A piston apparatus may be preferred for some systems). The increased pressure is transmitted to cavity 24 via flexible hose 26. Cavity 24, still acting as a negative lens element, becomes less negative (more positive) with increasing pressure changing the focal length in accordance with Equations (1) and (2).

Although a reduction value has been selected and shown in FIG. 2, enlargement values are also possible consistent with the invention.

Figure 3:
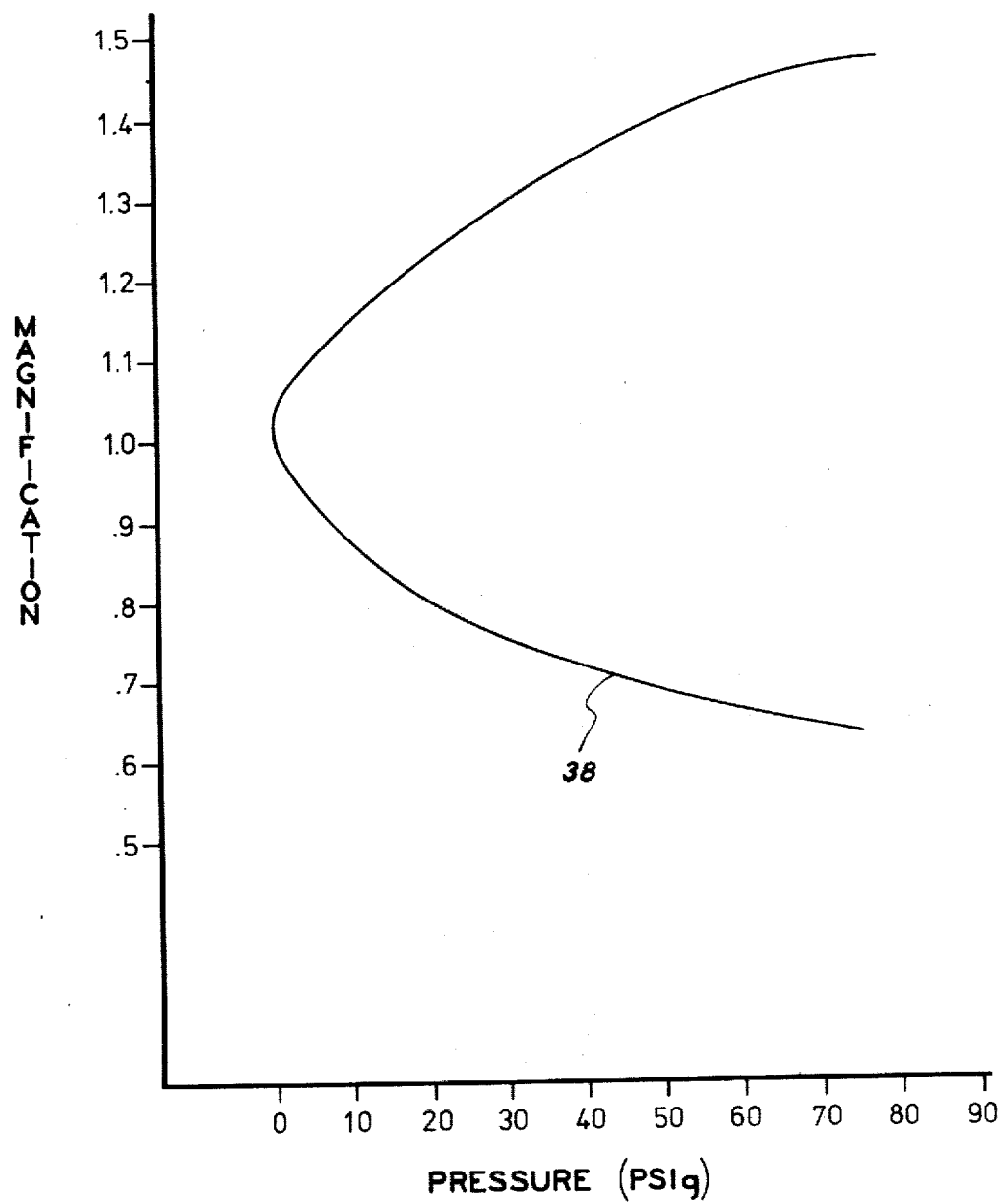
FIG. 3 is a graph plotting increase in gas pressure vs. magnification changes for the lens of FIG. 1.

FIG. 3 shows a plot 38 of change in magnification vs. gas pressure. As previously mentioned, Freon 115 has a refractive index of 1.001 at room pressure and 1.007 at a pressure of 75 psi. This change in refractive index yields a focal length change which, in turn allows a magnification range of 1.5 to 0.64 in accordance with Equation (1). It is of interest to note that one pressure yields a focal length which is useful at two different magnification positions e,g, at 65 psig. a reduction of 0.647 or an enlargement of 1.45 may be accomplished with suitable translation of lens 10 towards or away from image plane 16, respectively.

Changes in system parameters at five selected magnification positions is provided in Table 2. In view of the increased pressure in the inter-lens cavity, the surrounding lenses B, C should be constructed of relatively strong material. A preferred material is a hard crown glass.

TABLE 2

| Magnification | 1.0X | .77X | .71X | .67X | .64X |
|---|---|---|---|---|---|
| $S_1$ (mm) | 269.6 | 308.2 | 320.5 | 329.4 | 336.2 |
| $S_5$ (mm) | 264.4 | 226.6 | 214.21 | 205.4 | 198.6 |
| Gas Index | 1.001 | 1.003 | 1.0045 | 1.006 | 1.007 |
| f number | 11.0 | 11.0 | 11.0 | 11.0 | 11.0 |
| Semi Field Angle | 24 | 24 | 24 | 24 | 24 |
| Total Conjugate (mm) | 599.3 | 599.3 | 599.3 | 599.3 | 599.3 |
| Effective Focal Length (mm) | 152.8 | 150.2 | 148.4 | 146.9 | 145.6 |

Figure 4:
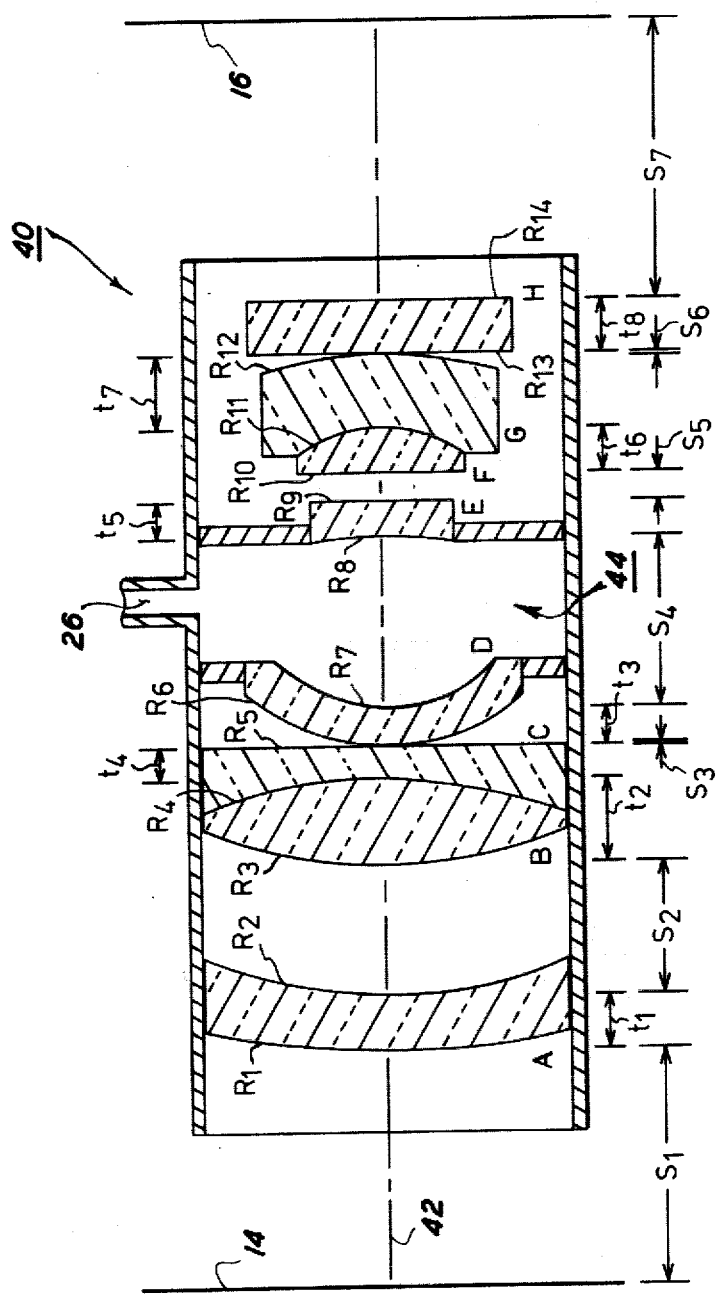
FIG. 4 is an optical diagram of a second embodiment of the present invention.

FIG. 4 illustrates a second embodiment of the present invention. A zoom lens generally indicated as 40 is disposed on optical axis 42. Lens 40 comprises elements A–H. Separating meniscus elements D and E is cavity 44 which, as in the previous embodiment, again acts as a negative lens which becomes more positive with increases in index of refraction caused by pressure increases. Table 3 is a chart providing constructional data for this embodiment.

TABLE 3

| Lens | Radius | Thickness | Spacing | $n_d$ | v |
|---|---|---|---|---|---|
| | | | $S_1 = 379.18$ | | |
| A | $R_1 = 187.3280$ | | | | |
| | | $t_1 = 8.40$ | | 1.651 | 55.8 |
| | $R_2 = 78.6647$ | | | | |
| | | | $S_2 = 31.8409$ | | |
| B–C Doublet | $R_3 = 68.7752$ | | | | |
| | | $t_2 = 11.28$ | | 1.651 | 55.8 |
| | $R_4 = -147.8520$ | | | | |
| | | $t_3 = 7.20$ | | 1.526 | 51.0 |
| | $R_5 = 385.7787$ | | | | |
| | | | $S_3 = .5$ | | |
| D | $R_6 = 35.0314$ | | | | |
| | | $t_4 = 6.480$ | | 1.633 | 57.7 |
| | $R_7 = 30.6058$ | | | | |
| | | | $S_4 = 25.941$ | Gas | |
| E | $R_8 = -70.4804$ | | | | |
| | | $t_5 = 6.4800$ | | 1.746 | 27.9 |
| | $R_9 = 1518.4936$ | | | | |
| | | | $S_5 = 4.4984$ | | |
| F–G Doublet | $R_{10} = -4192.0727$ | | | | |
| | | $t_6 = 7.20$ | | 1.591 | 39.7 |
| | $R_{11} = -25.5272$ | | | | |
| | | $t_7 = 11.680$ | | 1.645 | 37.0 |
| | $R_{12} = -67.6515$ | | | | |
| | | | $S_6 = 0.500$ | | |
| H | $R_{13} = -2415.7485$ | | | | |
| | | $t_8 = 8.4$ | | 1.651 | 55.8 |
| | $R_{14} = -294.0486$ | | | | |

TABLE 3-continued

| Lens | Radius | Thickness | Spacing | $n_d$ | v |
|---|---|---|---|---|---|
| | | | $S_7 = 451/1933$ | | |

Note: All dimensions are in millimeters.

Positive radius indicates center of curvature is to right.

Negative radius indicates center of curvature is to left.

Changes in system parameters at three selected magnification positions are provided in Table 4.

TABLE 4

| Magnification | 1.0X | .78X | .647X |
|---|---|---|---|
| $S_1$ (mm) | 379.18 | 437.72 | 481.98 |
| $S_7$ (mm) | 451.18 | 392.65 | 348.38 |
| Gas Index | 1.001 | 1.003 | 1.007 |
| f number | 11.0 | 12.4 | 13.4 |
| Semi-Field Angle | 20° | 20° | 20° |
| Total Conjugate (mm) | 960.4 | 960.4 | 960.4 |
| Effective Focal Length (mm) | 235.3 | 231.6 | 224.6 |

Similar evaluation was also done on a split Dagor-type lens of the type described in U.S. Pat. No. 3,592,531. The results were less satisfactory than the preceding examples. Lens types completely unsuitable for gas zoom lens applications include heliar, tessar and triplet, among others.

The specific reason for certain lenses groups working well are not completely understood but the common characteristic of the successful lens groups was the presence of meniscus elements which define a central cavity. The central cavity under these conditions approximates a thick, negative lens whose power changes in response to changes in the index of refraction of the enclosed gas induced by changes in applied pressure. As seen, the central cavity lens becomes more positive in response to the increased applied pressure. This specific configuration is not a characteristic of the other unsuitable lens groups.

There was an additional lens type, the double gauss, which did not perform well even though meniscus elements did define the central cavity. It is theorized that the unsatisfactory performance was due to excessive separation between the principal planes and a correction of this would improve the performance.

Turning now to a consideration of the most appropriate gases to use as the inter-lens medium, the main factors are as follows:

1. It is desired that the pressure required to "zoom" the lens be as small as possible. This, from equation (2), leads to the desirability of the index of refraction of the gas at atmospheric pressure being high.

2. The gas should not condense into a liquid when subjected to the maximum required pressure. In other words, the vapor pressure of the gas should exceed the maximum required pressure.

3. The gas should be non-toxic, non-corrosive, optically clear, non-explosive, and non-flammable.

4. The gas should be readily available at a modest cost. Table 5 lists a group of preferred gases and their properties.

TABLE 5

| GAS | INDEX OF REFRAC. ($n_o$) AT ATMOSPH. PRESSURE & AT 15° C. | PRESSURE REQUIRED (ASSUMES IDEAL GAS) | VAPOR PRESSURE AT 15° C. |
|---|---|---|---|
| Freon 218 ($C_3F_8$) | 1.001090 | 6.5atm | 6.8atm |
| Freon 115 ($C_2 Cl F_8$) | 1.001078 | 6.6 | 6.8 |
| Freon 13B1 (C Br $F_3$) | 1.000924 | 7.5 | 12.0 |
| Freon 116 ($CF_3$—$CF_3$) | 1.000777 | 7.8 | 27. |
| Freon 13 (C Cl $F_3$) | 1.000755 | 8.9 | 27. |
| Sulfur hexafluride (S F) | 1.000725 | 9.3 | 18 |

Although the preferred embodiments have been described as having only the central cavity filled with gas, it has been determined that the lens works satisfactorily even if the additional air spaces within the lens are in communication with the central cavity. This is true so long as the volume of the outer spaces is low relative to the central cavity, i.e. the FIG. 1 embodiment.

And, although the zoom lens has been shown in a full frame flash copying environment, it can be utilized in a slit scan type of copying system and in other optical systems requiring magnification. As a final observation, although the preferred embodiment indicated the preferred gas is at atmospheric pressure at 1× position, it may be preferable to have a slight amount of pressure to maintain tight housing seals.

What is claimed is:

1. A gas zoom lens system consisting essentially of a first lens group and a second lens group, each group consisting of two elements, the first lens group consisting, from the front to the rear, a first positive meniscus element convex to the front and a second negative meniscus element convex to the front, said second group consisting from the front to the rear, a first negative meniscus element concave to the front and a second positive meniscus element concave to the front, said second element of said first group and said first element of said second group defining, between their opposed surfaces, a cavity filled with a gas having a characteristic index of refraction, said lens system further including means to vary the pressure of said gas thereby causing a corresponding variation in the focal length of the system.

2. A gas zoom lens system made substantially according to the following specifications:

| Lens | Radius | Thickness | Spacing | $n_d$ | v |
|---|---|---|---|---|---|
| | | | $S_1 = 269.55$ | | |
| A | $R_1 = 27.0104$ | | | | |
| | | $t_1 = 9.79$ | | 1.487 | 70.41 |
| | $R_2 = 53.2409$ | | | | |
| | | | $S_2 = 1.59$ | | |
| B | $R_3 = 21.3087$ | | | | |
| | | $t_2 = 4.0$ | | 1.755 | 27.58 |

-continued

| Lens | Radius | Thickness | Spacing | $n_d$ | v |
|---|---|---|---|---|---|
|  | $R_4 = 15.5397$ |  |  |  |  |
|  |  |  | $S_3 = 25.93$ | Gas |  |
| C | $R_5 = -26.8834$ |  |  |  |  |
|  |  | $t_3 = 4.0$ |  | 1.755 | 27.58 |
|  | $R_6 = -35.1491$ |  |  |  |  |
|  |  |  | $S_4 = 1.68$ |  |  |
| D | $R_7 = -60.3301$ |  |  |  |  |
|  |  | $t_4 = 10.98$ |  | 1.487 | 70.41 |
|  | $R_8 = -29.0170$ |  |  |  |  |
|  |  |  | $S_5 = 264.41$ |  |  |

Note All dimensions being in millimeters, positive radius indicating center of curvature is to right, negative radius indicating center of curvature is to left.

3. A gas zoom lens system consisting essentially of a first, and second lens group, the first lens group consisting, from the front to the rear of a first negative meniscus element convex to the front, a first doublet element comprising a double convex element cemented to a negative meniscus element, a third negative meniscus element convex to the front, said second group consisting, from the front to the rear, of a first negative meniscus element concave to the front, a first doublet comprising a positive meniscus element cemented to a second negative meniscus element both elements concave to the front and a thick positive meniscus element having a substantially flat front surface, said second negative meniscus element of said first group and said first negative meniscus element of said second group defining, between their opposed surfaces, a cavity filled with a gas having a characteristic index of refraction, said lens system further including means to vary the pressure of said gas thereby causing a corresponding variation in the focal length of the system.

4. A gas zoom lens system made substantially according to the following specification:

| Lens | Radius | Thickness | Spacing | $n_d$ | v |
|---|---|---|---|---|---|
|  |  |  | $S_1 = 379.18$ |  |  |
| A | $R_1 = 187.3280$ |  |  |  |  |
|  |  | $t_1 = 8.40$ |  | 1.651 | 55.8 |
|  | $R_2 = 78.6647$ |  |  |  |  |
|  |  |  | $S_2 = 31.8409$ |  |  |
| B-C Doublet | $R_3 = 68.7752$ |  |  |  |  |
|  |  | $t_2 = 11.28$ |  | 1.651 | 55.8 |
|  | $R_4 = -147.8520$ |  |  |  |  |
|  |  | $t_3 = 7.20$ |  | 1.526 | 51.0 |
|  | $R_5 = 385.7787$ |  |  |  |  |
|  |  |  | $S_3 = .5$ |  |  |
| D | $R_6 = 35.0314$ |  |  |  |  |
|  |  | $t_4 = 6.480$ |  | 1.633 | 57.7 |
|  | $R_7 = 30.6058$ |  |  |  |  |
|  |  |  | $S_4 = 25.941$ | Gas |  |
| E | $R_8 = -70.4804$ |  |  |  |  |
|  |  | $t_5 = 6.4800$ |  | 1.746 | 27.9 |
|  | $R_9 = 1518.4936$ |  |  |  |  |
|  |  |  | $S_5 = 4.4984$ |  |  |
| F-G Doublet | $R_{10} = -4192.0727$ |  |  |  |  |
|  |  | $t_6 = 7.20$ |  | 1.591 | 39.7 |
|  | $R_{11} = -25.5272$ |  |  |  |  |
|  |  | $t_7 = 11.680$ |  | 1.645 | 37.0 |
|  | $R_{12} = -67.6515$ |  |  |  |  |
|  |  |  | $S_6 = 0.500$ |  |  |
| H | $R_{13} = -2415.7485$ |  |  |  |  |
|  |  | $t_8 = 8.4$ |  | 1.651 | 55.8 |
|  | $R_{14} = -294.0486$ |  |  |  |  |
|  |  |  | $S_7 = 451.1833$ |  |  |

Note:
All dimensions being in millimeters, positive radius indicating center of curvature is to right, negative radius indicating center of curvature is to left.

* * * * *